(12) United States Patent
Eastwood (10) Patent No.: US 7,407,357 B2
(45) Date of Patent: Aug. 5, 2008

(54) HAY BALE CARRIER

(76) Inventor: Bruce E. S. Eastwood, P.O. Box 588, Boswell, OK (US) 74727

( * ) Notice: Subject to any disclaimer, the term of this patent is extended or adjusted under 35 U.S.C. 154(b) by 0 days.

(21) Appl. No.: 11/299,920

(22) Filed: Dec. 12, 2005

(65) Prior Publication Data

US 2006/0099060 A1    May 11, 2006

Related U.S. Application Data (63) Continuation of application No. 10/228,013, filed on Aug. 23, 2002, now abandoned.

(51) Int. Cl.
*A01D 85/00* (2006.01)
*A01D 90/00* (2006.01)
*B60P 3/00* (2006.01)

(52) U.S. Cl. ...................... 414/24.5; 414/459

(58) Field of Classification Search ............. 414/24.5, 414/111, 434, 435, 436, 459, 460, 789.7, 414/537, 531; 294/82.19, 67.31, 67.33; 198/520, 198/517; 14/71.7; 114/344
See application file for complete search history.

(56) References Cited

U.S. PATENT DOCUMENTS

| | | | | |
|---|---|---|---|---|
| 4,072,241 A | * | 2/1978 | Parker et al. ............... 414/24.5 |
| 4,076,137 A | * | 2/1978 | Kucera .......................... 414/460 |
| 4,204,790 A | * | 5/1980 | Baxter .......................... 414/24.5 |
| 4,248,561 A | * | 2/1981 | Graves ......................... 414/24.5 |
| 5,906,467 A | * | 5/1999 | Nitzsche ..................... 414/24.5 |
| 5,919,021 A | * | 7/1999 | Eiland .......................... 414/111 |
| 6,019,562 A | * | 2/2000 | Cheatham ..................... 414/111 |

* cited by examiner

*Primary Examiner*—Saul Rodriguez
*Assistant Examiner*—Gregory W Adams
(74) *Attorney, Agent, or Firm*—Dunlap Codding & Rogers (57) ABSTRACT

An apparatus and method for transporting round hay bales disposed on a bale support ground surface. The apparatus has a frame, a frame support assembly, a first and a second rail. The frame has a first and a second portion. The first portion is connectable to a towing vehicle and the second portion is pivotally movable relative to the first portion to cooperate with the first portion to move the frame between a transporting position and a loading position. The first and second rails are movable between first, second, and third positions. In the first position, the first and second rails are lowered to capture the round hay bale. In the second position, the first and second rails are raised and aligned for transporting the round hay bale. In the third position, the first and second rails are positioned generally downwardly and outwardly for unloading the round hay bale.

13 Claims, 6 Drawing Sheets

HAY BALE CARRIER

CROSS-REFERENCE TO RELATED APPLICATIONS

This application is a continuation of U.S. Ser. No. 10/228,013, filed Aug. 23, 2002, now abandoned the content of which is hereby incorporated herein by reference.

BACKGROUND OF THE INVENTION

1. Field of the Invention

The present invention relates generally to a hay bale carrier, and more particularly, but not by way of limitation, to an improved hay bale carrier for loading, transporting, and unloading round hay bales.

2. Brief Description of Related Art

Hauling round hay bales in the past has been a time-consuming process. A variety of different carriers have been developed so as to reduce the amount of time for hauling round hay bales. Most carriers have been designed to capture and transport one round hay bale at a time. For example, a forklift-like device has been used to pierce the round hay bale and place the round hay bale on a trailer. Other carriers can transport a plurality of round hay bales. However, these types of carriers require more than one operator to load, transport, and unload the round hay bales due to the size and weight of a single round hay bale. Typically, each round hay bale weighs several hundred pounds.

Other carriers have been designed to utilize the labor of a single operator. However, the operation of these carriers require the carrier to be stopped and positioned over or in front of the hay bale. In addition, some carriers require an entire load to be unloaded and then reloaded in order to load an additional hay bale. The stationary position of engaging and loading the hay bale and the process of unloading and reloading requires additional time in the process of loading, transporting, and unloading the hay bales.

To this end, a need exists for a hay bale carrier that permits an operator to load, transport, and unload one or more round hay bales. It is to such an apparatus that the present invention is directed.

DETAILED DESCRIPTION OF THE INVENTION

Figure 1:
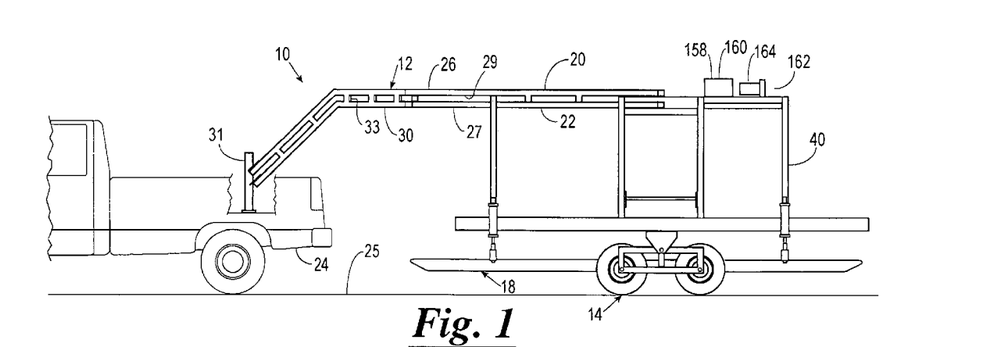
FIG. 1 is a side elevational view of a hay bale carrier constructed in accordance with the present invention shown attached to a towing vehicle and in a transporting position.
Figure 2:
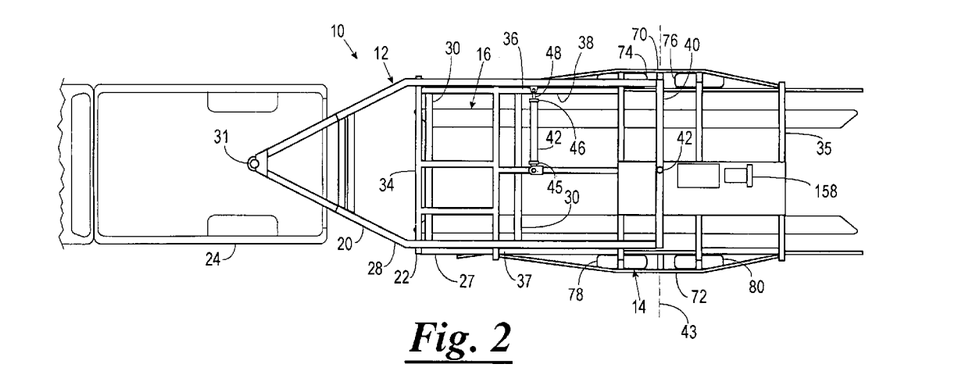
FIG. 2 is a top plan view of the hay bale carrier in the transporting position.

Referring now to the drawings, and more particularly to FIGS. 1 and 2, a hay bale carrier 10 constructed in accordance with the present invention is shown. Broadly, the hay bale carrier 10 includes a frame 12, a frame support assembly 14, and a first rail assembly 16 and a second rail assembly 18 (FIG. 2) which are selectively movable between a first position for loading a round hay bale, a second position for transporting the round hay bale, and a third position for unloading the round hay bale.

Figure 6:
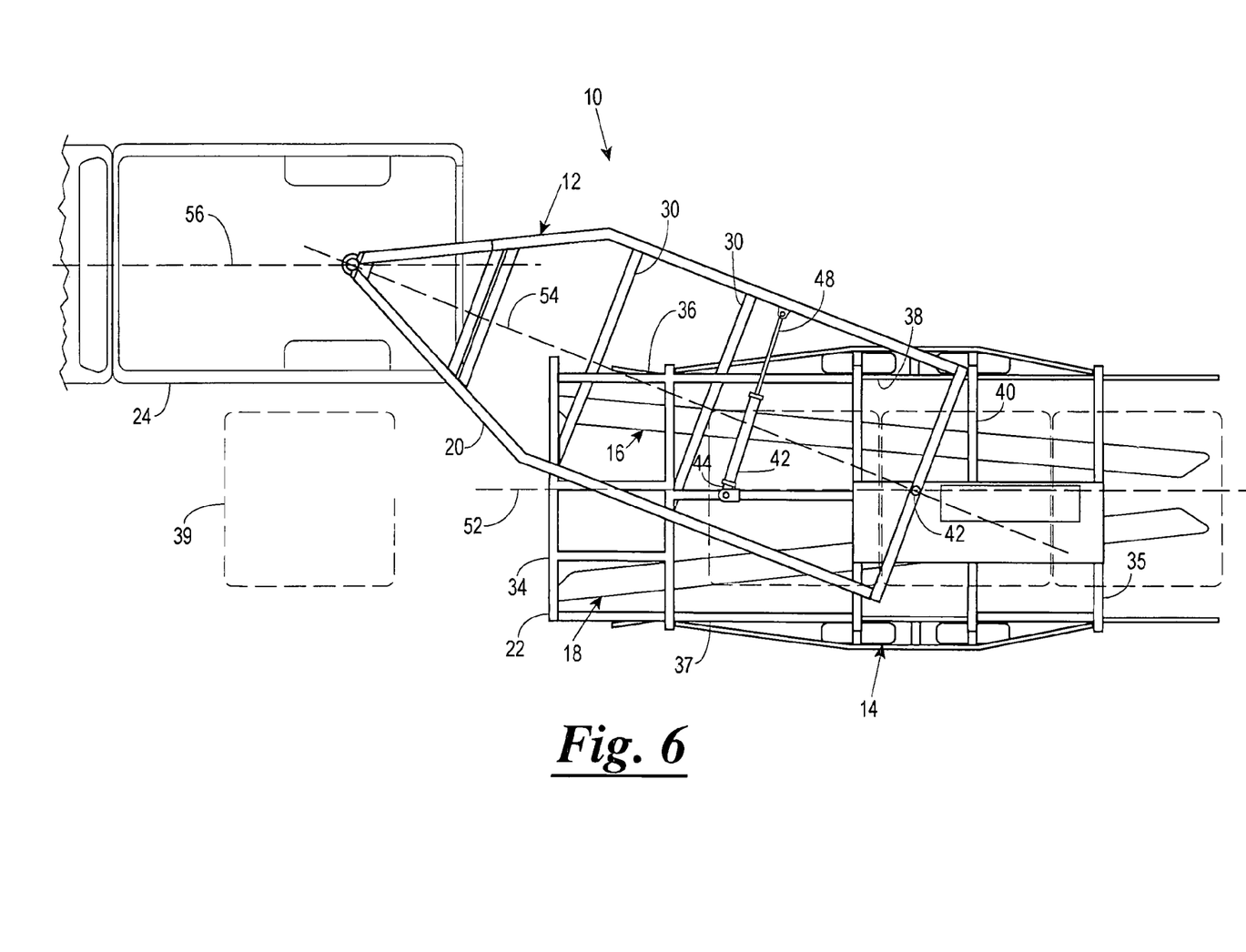
FIG. 6 is a top view of the hay bale carrier in the loading position showing a plurality of round hay bales positioned thereon.

The frame 12 includes a first portion 20 and a second portion 22. The first portion 20 of the frame 12 functions as a trailer tongue and therefore is adapted to be pivotally connected to a towing vehicle 24, such as a tractor, truck, pickup, or other motor vehicle so that the frame 12 may be towed along a bale support ground surface 25. As best shown in FIGS. 1, 2, and 6, the first portion 20 of the frame 12 is a double-layered structure that includes an upper frame structure 26 and a lower frame structure 27 supported in a spaced apart relationship by a plurality of spacer members 28 so as to form a channel 29. The upper frame structure 26 and the lower frame structure 27 are similar in construction except that the lower frame structure 27 is provided with a plurality of intermediate cross members 30 (FIGS. 2 and 6) for supporting the second portion of the frame 12 in a manner to be discussed below.

A forward end of the first portion 20 of the frame 12 is angled downwardly and provided with a collar 31. The collar 31 is adapted to be pivotally connected to a ball hitch (not shown) mounted to the towing vehicle 24 so as to permit the first portion 20 of the frame 12 to rotate freely relative to the towing vehicle 24. However, any suitable connector that allows the first portion 20 of the frame 12 to rotate freely relative to the towing vehicle 24 may be used.

Figure 3:
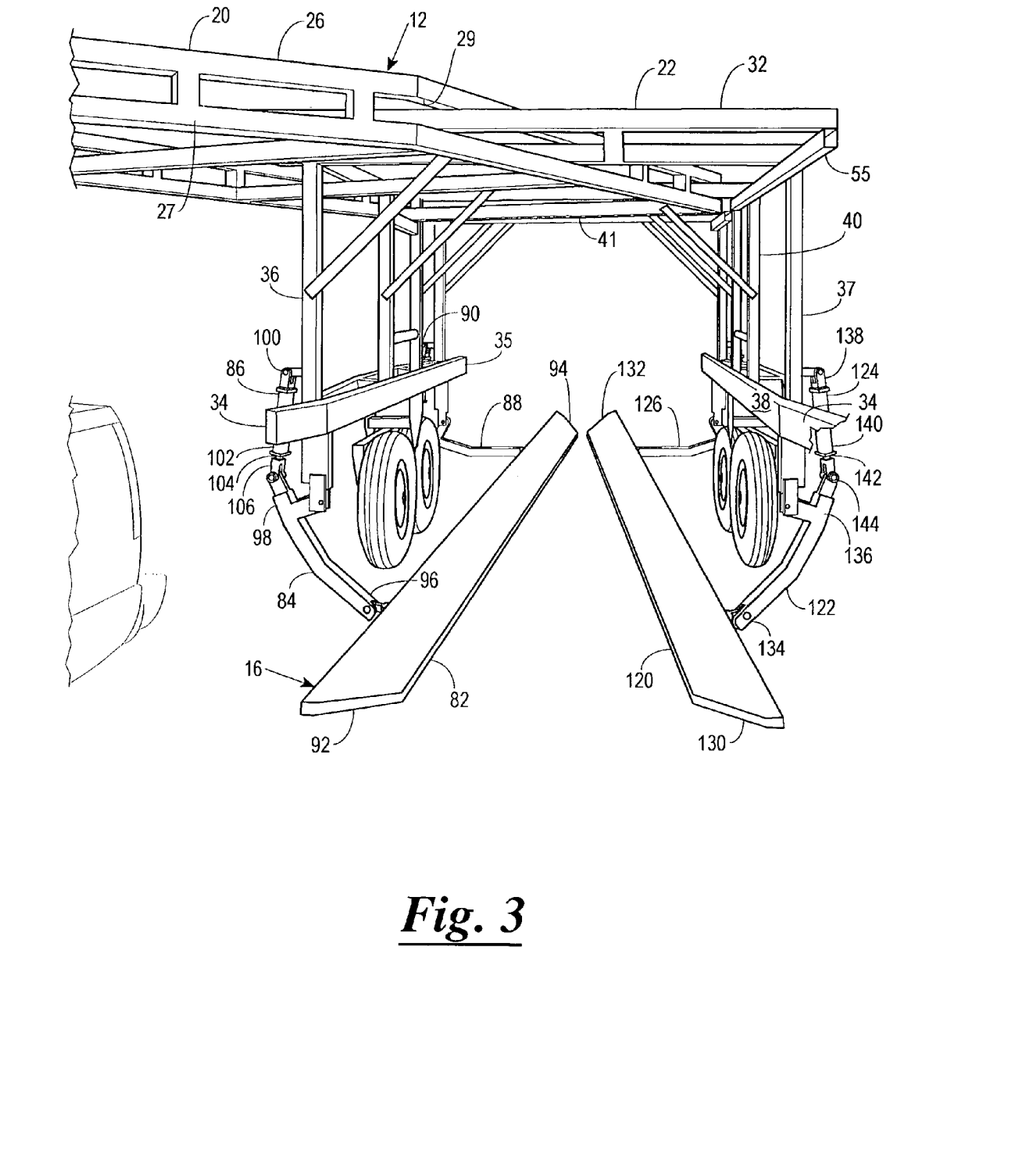
FIG. 3 is a front perspective view of the hay bale carrier in a loading position.
Figure 4:
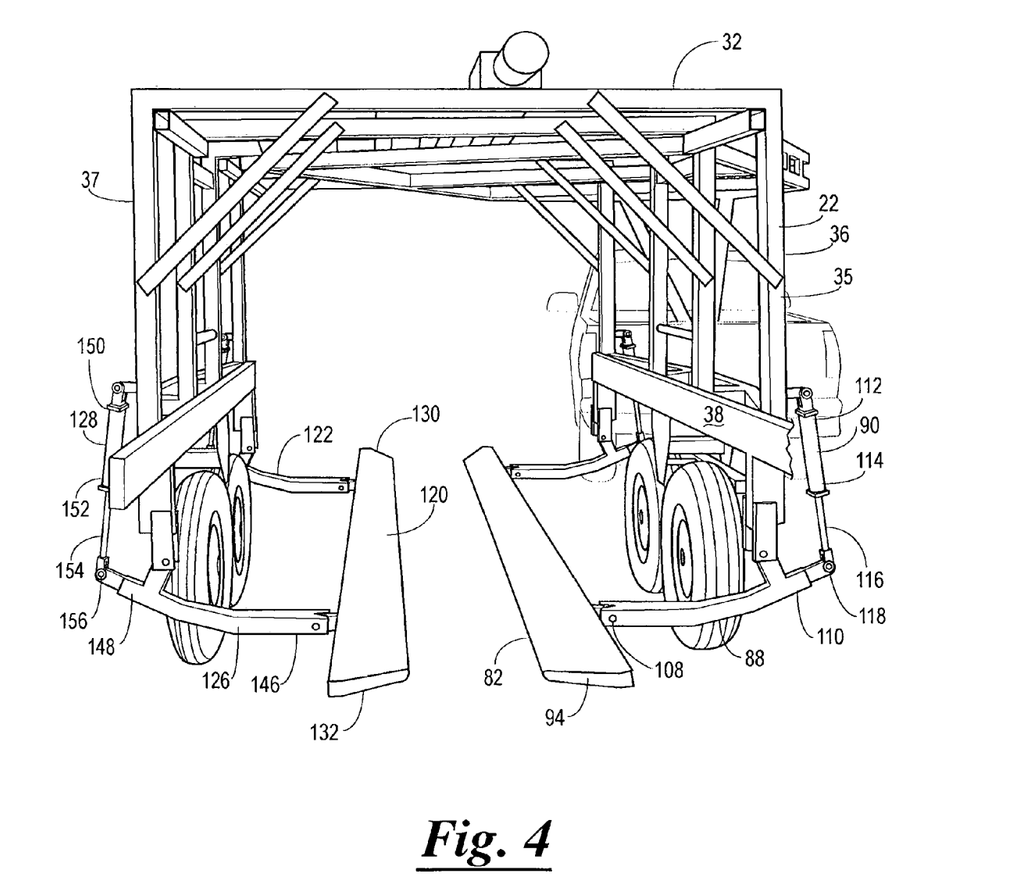
FIG. 4 is a rear perspective view of the hay bale carrier in the transporting position.

As best shown in FIGS. 3 and 4, the second portion 22 of the frame 12 has a substantially inverted U-shaped configuration and includes an upper end 32, a front end 34, a rear end 35, a first side 36, and a second side 37 cooperating to define a hay bale receiving space 38. Each of the front end 34 and the rear end 35 of the second portion 22 of the frame 12 is open to permit a round hay bale to pass to and from the hay bale receiving space 38. The hay bale receiving space 38 may be sized and configured to hold a single round hay bale, designated as 39, or a plurality of round hay bales (shown as broken lines in FIGS. 5-8) of various sizes in an end-to-end relationship.

The second portion 22 of the frame 12 is shown to be constructed of a plurality of vertical support members 40 interconnected to a plurality of cross members 41. However, it will be appreciated that the second portion 22 of the frame 12 can be constructed in a variety of different configurations so long as the second portion 22 is capable of receiving and supporting a desired number of round hay bales.

The first portion 20 and the second portion 22 of the frame 12 are assembled so that the upper end 32 of the second portion 22 of the frame is slidably positioned in the channel 29 of the first portion 20 and pivotally connected by a pin 42 which is substantially aligned with an central axis of rotation 43 (FIG. 2) of the frame support assembly 14 such that the second portion 22 is rotatable relative to the first portion 20 between an aligned position (FIG. 2) and a rotated position (FIG. 6). The first portion 20 and the second frame 22 are shown to constructed primarily of steel tubing welded together to form the first and second portions 20 and 22. As such, to assemble the first portion 20 to the second portion 22, upper end 32 of the second portion 22 is positioned in the channel 29 between the upper frame structure 26 and the lower frame structure 27 prior to final construction of the first portion 20. Alternatively, the first portion 20 can be fully constructed and the construction of the second portion 22 finalized after connection of the first portion 20 and the second portion 22. Additionally, the first and second portions 20 and 22 may be constructed of members which are bolted together rather than welded together.

The second portion 22 of the frame 12 is rotated between the aligned position and the rotated position by a cylinder 44 (FIGS. 2 and 6). The cylinder 44 is shown having a first end 45, a second end 46, and a reciprocating rod 48 extending from the second end 46 of the cylinder 44. The cylinder 44 is movable between a retracted position and an extended position.

As shown in FIGS. 2 and 6, the first end 45 of the cylinder 44 is pivotally mounted to the second portion 22 of the frame 12 and the reciprocating rod 48 of the cylinder 44 is pivotally connected to the first portion 20 of the frame 12. In the retracted position of the cylinder 44 (FIG. 2), the second portion 22 of the frame 12 is caused to be aligned with the first portion 20 of the frame 12. That is, the second portion 22 is positioned such that a central longitudinal axis of symmetry 52 of the second portion 22 of the frame 12 is aligned with a central longitudinal axis of symmetry 54 of the first portion 20. To facilitate alignment of the second portion 22, the upper end 32 of the second portion 22 of the frame 12 is provided with a stop member 55 (FIG. 3) along the first side 36 thereof. The stop member 55 engages the corresponding side of the lower frame structure 27 of the first portion 20 of the frame 12 when the cylinder 44 is in the retracted position.

In the extended position (FIG. 6), the second portion 22 of the frame 12 is caused to be rotated about the pin 42 with the second portion 22 of the frame 12 sliding over the lower frame structure 27 so that the central longitudinal axis of symmetry 52 of the second portion 22 is misaligned relative to the central longitudinal axis of symmetry 54 of the first portion 20 of the frame 12. With the second portion 22 in the rotated position, the frame 12 is caused to swing outwardly to a loading position upon the hay bale carrier 10 being put in forward motion by the towing vehicle 24. In the loading position, the second portion 22 of the frame 12 moves so that the central longitudinal axis of symmetry 52 of the second portion 22 of the frame 12 is substantially parallel to a central longitudinal axis of symmetry 56 of the towing vehicle 20 as the frame 12 is being towed by the towing vehicle 24.

Referring again to FIG. 2, the frame support assembly 14 includes a first wheel assembly 70 and a second wheel assembly 72. The first wheel assembly 70 includes a first wheel 74 and a second wheel 76 operably connected to the first side 36 of the second portion 22 of the frame 12. The second wheel assembly 72 includes a third wheel 78 and a fourth wheel 80 operably connected to the second side 37 of the second portion 22 of the frame 12. The first wheel assembly 70 and the second wheel assembly 72 cooperate to rollingly support the frame 12. To maintain the first and second wheel assemblies 70 and 72 in alignment under load, the first, second, third, and fourth wheels 74, 76, 78, and 80 are supported by spindles which are directed inwardly to provide increased lateral support to the first and second wheel assemblies 70 and 72. It should further be understood that any number of wheel assemblies suitable to support the frame may be used. In addition, although wheels are illustrated as a preferred structure for movably supporting the frame 12, it should be understood that any suitable structure for movably supporting the frame 12 may be used, such as skids.

Referring now to FIG. 3, the first rail assembly 16 includes a first rail 82, a forward linkage member 84, a forward cylinder 86, a rearward linkage member 88, and a rearward cylinder 90. The first rail 82 has a forward end 92 and a rearward end 94 and is secured to the second portion 22 of the frame 12 so as to be supported in the hay bale receiving space 38 of the second portion 22 of the frame 12 proximate the first side 36 thereof.

The first end 96 the forward linkage member 84 is attached to the first rail 82 with a ball joint 99 proximate the forward end 92 of the first rail 82 so as to permit multidirectional rotation of the first rail 82 relative to the forward linkage member 84. Further, the forward linkage member 84 is pivotally attached to the front end 34 of the first side 36 of the second portion 22 of the frame 12 proximate the second end 98 of the forward linkage member 84.

The forward cylinder 86 has a first end 100, a second end 102, and a reciprocating rod 104 extending from the second end 102 of the forward cylinder 86. The first end 100 of the cylinder 86 is pivotally mounted proximate the front end 34 of the first side 36 of the second portion 22 of the frame 12. The reciprocating rod 104 of the cylinder 86 is connected to a clevis 106 which is pivotally connected to the second end 98 of the forward linkage member 84.

As best shown in FIG. 4, the rearward linkage member 88 is arcuately shaped and has a first end 108 and a second end 110. The first end 108 of the forward linkage member 88 is attached to the first rail 82 with a ball joint 111 proximate the rearward end 94 of the first rail 82 so as to permit multidirectional rotation of the first rail 82 relative to the rearward linkage member 88. Further, the rearward linkage member 88 is pivotally attached to the rear end 35 of the first side 36 of the second portion 22 of the frame 12 proximate the second end 110 of the rearward linkage member 88.

The rearward cylinder 90 has a first end 112, a second end 114, and a reciprocating rod 116 extending from the second end 114 of the rearward cylinder 90. The first end 112 of the cylinder 90 is pivotally mounted proximate the rear end 35 of the first side 36 of the second portion 22 of the frame 12. The reciprocating rod 116 of the cylinder 90 is connected to a clevis 118 which is pivotally connected to the second end 110 of the rearward linkage member 88.

Referring now to FIGS. 3 and 4, the forward cylinder 86 and the rearward cylinder 90 of the first rail assembly 16 are each independently movable between the retracted and the extended position. When the forward cylinder 86 is moved to the retracted position, the forward cylinder 86 functions to rotate the forward linkage member 84 to cause the forward end 92 of the first rail 82 to move downwardly and outwardly to a position near the bale ground support surface 25. In the extended position, the forward cylinder 86 functions to rotate the forward linkage member 84 to cause the forward end 92 of the first rail 82 to move upwardly and inwardly so as to be substantially parallel to the bale ground support surface 25. When the rearward cylinder 90 is moved to the retracted position, the rearward cylinder 90 functions to rotate the rearward linkage member 88 to cause the rearward end 94 of the first rail 82 to move downwardly and outwardly to a position near the bale ground support surface 25. In the extended position, the rearward cylinder 90 functions to rotate the rearward linkage member 88 to cause the rearward end 94 of the first rail 82 to move upwardly and inwardly so as to be substantially parallel to the bale ground support surface 25.

The second rail assembly 18 includes a second rail 120, a forward linkage member 122, a forward cylinder 124, a rearward linkage member 126, and a rearward cylinder 128. The second rail 120 has a forward end 130 and a rearward end 132 and is secured to the second portion 22 of the frame 12 so as to be supported in the hay bale receiving space 38 of the second portion 22 of the frame 12 proximate the second side 37 of the second portion 22 of the frame 12.

The forward linkage member 122 is arcuately shaped and has a first end 134 and a second end 136. The first end 134 of the forward linkage member 122 is attached to the second rail 120 with a ball joint 137 proximate the forward end 130 of the second rail 120 so as to permit multidirectional rotation of the second rail 120 relative to the forward linkage member 122. Further, the forward linkage member 122 is pivotally attached to the front end 34 of the second side 37 of the second portion 22 of the frame 12 proximate the second end 136 of the forward linkage member 122.

The forward cylinder 124 has a first end 138, a second end 140, and a reciprocating rod 142 extending from the second end 140 of the forward cylinder 124. The first end 138 of the forward cylinder 124 is pivotally mounted proximate the front end 34 of the second side 37 of the second portion 22 of the frame 12. The reciprocating rod 142 of the forward cylinder 124 is connected to a clevis 144 which is pivotally connected to the second end 136 of the forward linkage member 122.

The rearward linkage member 126 is arcuately shaped and has a first end 146 and a second end 148. The first end 146 of the rearward linkage member 126 is pivotally attached to the second rail 120 proximate the rearward end 132 of the second rail 120. Further, the rearward linkage member 126 is attached to the rear end 35 of the second side 37 of the second portion 22 of the frame 12 with a ball joint 149 proximate the second end 148 of the rearward linkage member 126 so as to permit multidirectional rotation of the second rail 120 relative to the rearward linkage member 126.

The rearward cylinder 128 has a first end 150, a second end 152, and a reciprocating rod 154 extending from the second end 152 of the rearward cylinder 128. The first end 150 of the rearward cylinder 128 is shown pivotally mounted proximate the rear end 35 of the second side 37 of the second portion 22 of the frame 12. The reciprocating rod 154 of the rearward cylinder 128 is shown connected to a clevis 156 which is pivotally connected to the second end 148 of the rearward linkage member 126.

Referring again to FIGS. 3 and 4, the forward cylinder 124 and the rearward cylinder 128 of the second rail assembly 18 are each independently movable between the retracted and the extended position. When the forward cylinder 124 is moved to the retracted position, the forward cylinder 124 functions to rotate the forward linkage member 122 to cause the forward end 130 of the second rail 120 to move downwardly and outwardly to a position near the bale ground support surface 25. In the extended position, the forward cylinder 124 functions to rotate the forward linkage member 122 to cause the forward end 130 of the second rail 120 to move upwardly and inwardly so as to be substantially parallel to the bale ground support surface 25. When the rearward cylinder 128 is moved to the retracted position, the rearward cylinder 128 functions to rotate the rearward linkage member 126 to cause the rearward end 132 of the second rail 120 to move downwardly and outwardly to a position near the bale ground support surface 25. In the extended position, the rearward cylinder 128 functions to rotate the rearward linkage member 126 to cause the rearward end 132 of the second rail 120 to move upwardly and inwardly so as to be substantially parallel to the bale ground support surface 25.

Figure 5:
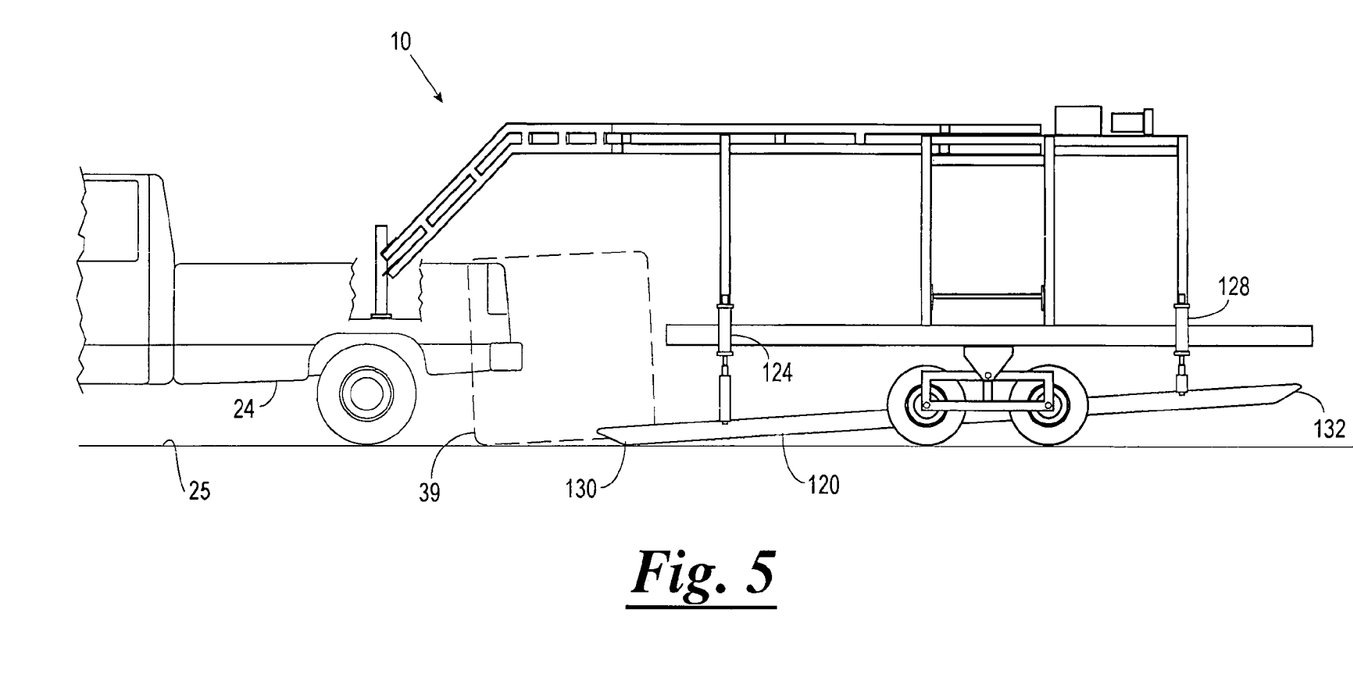
FIG. 5 is a side elevational view of the hay bale carrier in the loading position prepared to capture a round hay bale.

Referring now to FIGS. 3, 5, and 6, the first rail 82 and the second rail 120 are selectively moved to the first position to load the round hay bale. In the first position, the forward end 92 of the first rail 82 and the forward end 130 of the second rail 120 are lowered by the forward cylinders 86 and 124, respectively, to a position near the bale ground support surface 25. The forward end 92 of the first rail 82 and the forward end 130 of the second rail 120 are positioned generally downwardly and outwardly relative to the rearward end 94 of the first rail 82 and the rearward end 132 of the second rail 120 such that the first rail 82 and the second rail 120 are arranged in a substantially angled, V-shaped configuration. The forward ends 92 and 130 and the rearward ends 94 and 132 of the first and the second rails 82 and 120, respectively, are angled to facilitate capture of the round hay bale on the first and second rails 82 and 120, respectively, while the frame 12 is in the loading position and being towed by the towing vehicle 24.

Figure 7:
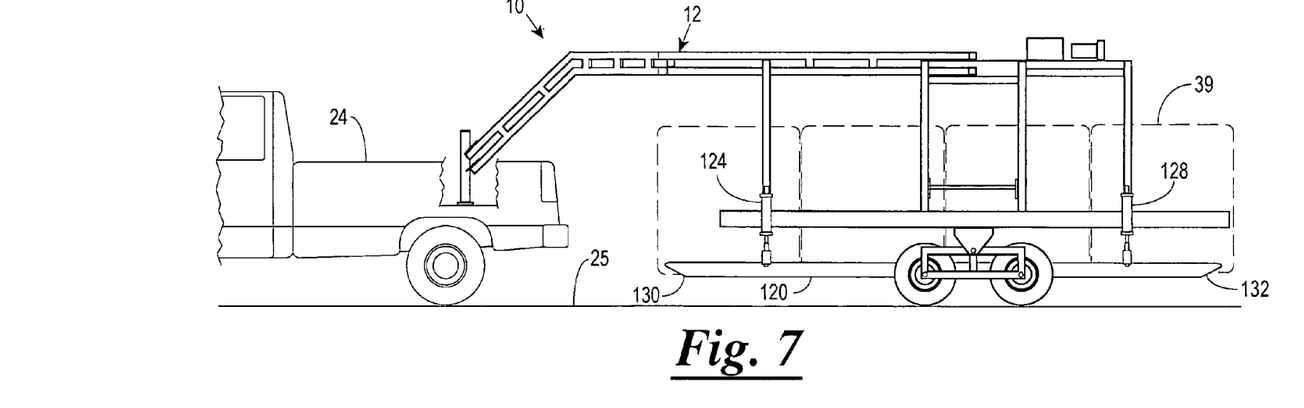
FIG. 7 is a side elevational view of the hay bale carrier in the transporting position transporting the plurality of round hay bales.

Referring now to FIGS. 4 and 7, in the second position, the first and second rails 82 and 120 are selectively moved to transport the round hay bale to a selected location while the frame 12 is in the transporting position and being towed by the towing vehicle 24. In the second position, the forward end 92 of the first rail 82 is raised and aligned with the rearward end 94 of the first rail 82 by the forward cylinder 86. Likewise, the forward end 130 of the second rail 120 is raised and aligned with the rearward end 132 of the second rail 120 by the forward cylinder 124 so that the first rail 82 and the second rail 120 are substantially parallel with each other and the bale supporting ground surface 25 so as to support the round hay bale in the hay bale receiving space 38 as the frame 12 is towed to the selected location.

Figure 8:
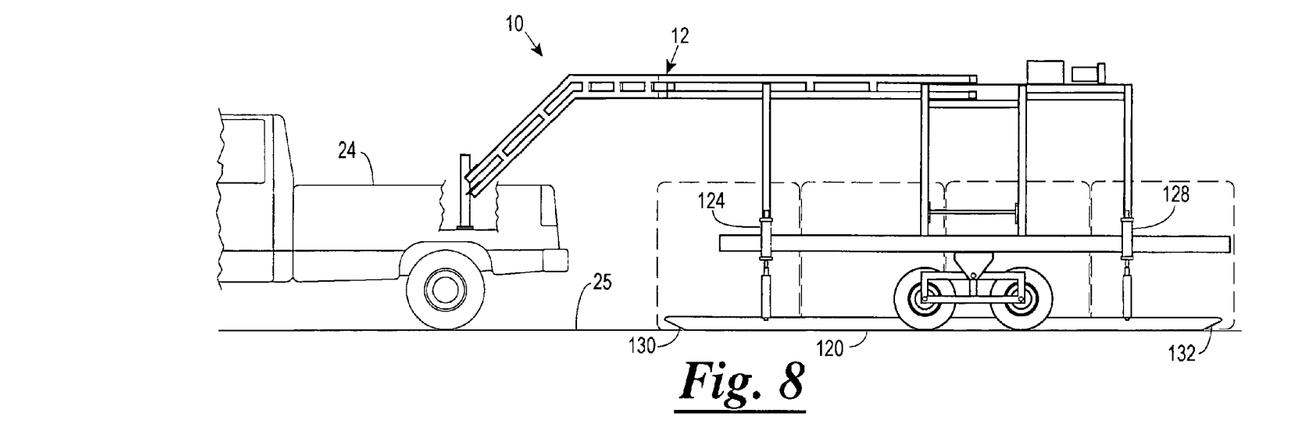
FIG. 8 is a side elevational view of the hay bale carrier in an unloading position.

Referring now to FIG. 8, upon arrival at the selected location the first rail 82 and the second rail 120 are moved into a third position for unloading the round hay bales. In the third position, the first rail 82 is moved generally downwardly and outwardly by the forward cylinder 86 and the rearward cylinder 90, and the second rail 120 is moved generally downwardly and outwardly by the forward cylinder 124 and the rearward cylinder 128, thus causing first and second rails 82 and 120 to release the round hay bales so as to cause the round hay bales to engage the bale support ground surface 25 and permit the frame 12 to be pulled away from the round hay bale.

It should be understood that the cylinders 44, 86, 90, 124, and 128 may be any suitable hydraulic cylinder known in the art, such as a double-acting hydraulic cylinder. To this end, a hydraulic assembly 158, shown in FIGS. 1-3, is mounted on the rear end 35 of the second portion 22 of the frame 12 and includes a power source 160, such as a 12 volt battery, a pump 161, a tank 162, a motor 164, and a control box (not shown) which includes corresponding control valves (not shown) for actuating the cylinders 44, 86, 90, 124, and 128. A twelve volt DC motor has been found to be suitable to operate the cylinders 44, 86, 90, 124, and 128. The motor 164 is associated with the tank 162, which holds hydraulic oil, and the hydraulic pump 161. The control box is preferably portable whereby a driver of the towing vehicle can position the control box inside the towing vehicle when operating. Because the operation of hydraulic circuits is well known in the art, as well as their various components, the hosing used in the present invention has been omitted from the drawings for the sake of clarity. It will further be understood that other types of cylinders may be used, such as pneumatic and electric.

In use, an operator first connects the first portion 20 of the frame 12 to the towing vehicle 24 (FIG. 1). The operator next actuates the cylinder 44 to the extended position to cause the second portion 22 of the frame 12 to move from the aligned position to the rotated position (FIG. 6).

The operator then actuates the forward cylinders 86 and 124 to cause the first rail 82 and the second rail 120 to move to the first position for loading the round hay bale (FIG. 6). The operator drives the towing vehicle 24 forward and the forward motion causes the frame 12 to swing outwardly to the loading position (FIG. 6). As the frame 12 is being towed by the towing vehicle 24, the operator aligns the bale receiving space 38 with a round hay bale so that the round hay bale is captured by the first and second rails 82 and 120 (FIG. 5). The forward motion of the frame 12 causes the round hay bale to slide up on the first and second rails 82 and 120.

If the operator desires to capture a plurality of round hay bales, the operator then drives to the location of the next round hay bale aligning the bale receiving space 38 with the round hay bale so that the round hay bale is captured. As each round hay bale is captured, it pushes the previously captured hay bale further back into the bale receiving space 38 (FIG. 6).

After the single or plurality of hay bales is captured, then the operator actuates the forward cylinders 86 and 124 to cause the first and second rails 82 and 120 to move to the second position for transporting the round hay bales (FIG. 7). The operator then actuates the cylinder 44 to the retracted position to cause the second portion 22 of the frame 12 to move from the rotated position to the aligned position (FIG. 2) which in turn causes the second portion 22 of the frame 12 to return to the transporting position.

The operator next transports the round hay bales to a selected location. Once the operator arrives the selected location, the operator actuates the forward cylinders 86 and 124 and the rearward cylinders 90 and 128 to cause the first rail and the second rails 82 and 120 to move to the third position for unloading the round hay bales (FIG. 8). The operator then tows the frame 12 away from the round hay bales.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed is:

1. An apparatus for loading, transporting and unloading round hay bales disposed on a bale support ground surface, comprising:

a frame having a first portion and a second portion, the first portion connectable to a towing vehicle and the second portion being pivotally movable relative to the first portion to cooperate with the first portion to move the frame between a transporting position and a loading position, in the transporting position a central longitudinal axis of symmetry of the first portion of the frame and a central longitudinal axis of symmetry of the second portion of the frame are each alignable with a central longitudinal axis of symmetry of the towing vehicle and in the loading position the central longitudinal axis of symmetry of the second portion of the frame is capable of being maintained in an offset relation whereby the central longitudinal axis of symmetry of the second portion of the frame is substantially parallel to the central longitudinal axis of symmetry of the towing vehicle, the second portion of the frame having a front end, a rear end, a first side, and a second side cooperating to define a hay bale receiving space, the front end of the second portion configured to permit a round hay bale to pass into the hay bale receiving space when the second portion of the frame is in the loading position;

means for movably supporting the frame on the bale support ground surface;

a first rail having a forward end and a rearward end, the first rail supported in the hay bale receiving space of the second portion of frame proximate the first side thereof and selectively movable relative to the second portion of the frame between a first position, a second position and a third position; and a second rail having a forward end and a rearward end, the second rail supported in the hay bale receiving space of the second portion of the frame proximate the second side thereof and selectively movable relative to the second portion of the frame between the first position, the second position and the third position, means for selectively moving the first and second rails between the first, second and third positions, the means including for each of the first and second rails at least one cylinder, linkage and pivot pin connecting each of the first and the second rails to the second portion, wherein in the first position of the first rail and the second rail, the forward end of the first rail is lowered and positioned generally downwardly and outwardly relative to the rearward end of the first rail and the forward end of the second rail is lowered and positioned generally downwardly and outwardly relative to the rearward end of the second rail such that the first and the second rails are disposed in an angular relationship relative to the central longitudinal axis of symmetry of the second portion of the frame along the entire length of the first and second rails whereby the first and second rails are arranged in a configuration to capture the round hay bale on the first and second rails as the apparatus is moved along the bale support ground surface, in the second position the forward end of the first rail is raised and aligned with the rearward end of the first rail and the forward end of the second rail is raised and aligned with the rearward end of the second rail so that the first and second rails are substantially parallel with each other and the bale supporting ground surface and support the round hay bale in the hay bale receiving space as the frame is towed to the selected location, and in the third position the forward end and the rearward end of the first rail are positioned generally downwardly and the forward end and the rearward end of the second rail are positioned generally downwardly so as to cause the round hay bale to engage the bale support ground surface and thereby permit the round hay bale to be removed from the first and second rails as the frame is pulled away from the round hay bale.

2. The apparatus of claim 1 wherein the first portion of the frame is pivotally connectable to the towing vehicle to permit the first portion of the frame to rotate freely relative to the towing vehicle.

3. The apparatus of claim 2 wherein the second portion of the frame is pivotally connected to the first portion of the frame and wherein the apparatus further comprises:

means for selectively pivoting the second portion of the frame between an aligned position and a rotated positioned, in the aligned position the second portion of the frame is aligned with the first portion of the frame whereby the frame is caused to move to the transporting position as the frame is being towed by the towing vehicle, and in the rotated position the second portion of the frame is rotated so as to be misaligned relative to the first portion of the frame whereby the frame is caused to swing to the loading position as the frame is being towed by the towing vehicle.

4. The apparatus of claim 1 wherein the forward and the rearward ends of the first and the second rails are angled to facilitate capture of the round hay bale when the first and second rails are positioned in the first position.

5. The apparatus of claim 1 wherein the hay bale receiving space is sized to hold a plurality of round hay bales in an end-to-end relationship.

6. The apparatus of claim 1 wherein, in the third position of the first and second rails, the first and second rails are also moved outwardly so as to further enhance removal of the round hale bales from the first and second rails.

7. An apparatus for loading, transporting and unloading round hay bales wherein the round bale is disposed on a bale support ground surface, comprising:

a frame having a first portion and a second portion, the first portion connectable to a towing vehicle and the second portion being pivotally movable relative to the first portion to cooperate with the first portion to move the frame between a transporting position and a loading position, in the transporting position a central longitudinal axis of symmetry of the first portion of the frame and a central longitudinal axis of symmetry of the second portion of the frame are each alignable with a central longitudinal axis of symmetry of the towing vehicle and in the loading position the central longitudinal axis of symmetry of the second portion of the frame is capable of being maintained in an offset relation whereby the central longitudinal axis of symmetry of the second portion of the frame is substantially parallel to the central longitudinal axis of symmetry of the towing vehicle, the second portion of the frame having a front end, a rear end, a first side, and a second side cooperating to define a hay bale receiving space, the front end of the second portion configured to permit a round hay bale to pass into the hay bale receiving space when the second portion of the frame is in the loading position;

means for movably supporting the frame on the bale support ground surface;

a first rail having a forward end and a rearward end, the first rail supported in the hay bale receiving space of the second portion of frame proximate the first side thereof and selectively movable relative to the second portion of the frame between a first position, a second position and a third position;

a second rail having a forward end and a rearward end, the second rail supported in the hay bale receiving space of the second portion of the frame proximate the second side thereof and selectively movable relative to the second portion of the frame between the first position, the second position and the third position; and means for selectively moving the forward end and the rearward end of each of the first and second rails independently of one another as the first and second rails are selectively moved between the first, second and third positions, said means including for each of the first and the second rails at least one cylinder, linkage and pivot pin connecting each the first and the second rails to the second portion, wherein in the first position of the first rail and the second rail, the forward end of the first rail is lowered so that the forward end of the first rail extends downwardly and outwardly relative to the rearward end of the first rail and the forward end of the second rail is lowered so that the forward end of the second rail extends downwardly and outwardly relative to the rearward end of the second rail such that the first rail and the second rail are disposed in an angular relationship relative to the central longitudinal axis of symmetry of the second portion of the frame along the entire length of the first rail and the second rail to capture the round hay bale while the frame is being towed by the towing vehicle, in the second position the forward end of the first rail is raised and aligned with the rearward end of the first rail and the forward end of the second rail is raised and aligned with the rearward end of the second rail so that the first rail and the second rail are substantially parallel with each other and the bale supporting ground surface and support the round hay bale in the hay bale receiving space as the frame is towed to the selected location, and in the third position the first and second rails are positioned generally downwardly so as to cause the round hay bale to engage the bale support ground surface and thereby unload the round hay bale from the hay receiving space of the second portion of the frame as the frame is pulled away from the round hay bale.

8. The apparatus of claim 7 wherein the first portion of the frame is pivotally connectable to the towing vehicle to permit the first portion of the frame to rotate freely relative to the towing vehicle.

9. The apparatus of claim 8 wherein the second portion of the frame is pivotally connected to the first portion of the frame and wherein the apparatus further comprises:

means for selectively pivoting the second portion of the frame between an aligned position and a rotated positioned, in the aligned position the second portion of the frame is aligned with the first portion of the frame whereby the frame is caused to move to the transporting position as the frame is being towed by the towing vehicle, and in the rotated position the second portion of the frame is rotated so as to be misaligned relative to the first portion of the frame whereby the frame is caused to swing to the loading position as the frame is being towed by the towing vehicle.

10. The apparatus of claim 9 wherein in the loading position, the longitudinal axis of the second portion of the frame is substantially parallel to the longitudinal axis of the towing vehicle.

11. The apparatus of claim 7 wherein, in the first position of the first and second rails the first and second rails are arranged in a substantially angled, V-shaped configuration.

12. The apparatus of claim 7 wherein, in the position of the first and second rails, the forward ends of the first and second rails and the rearward ends of the first and second rails are positioned generally downwardly and outwardly relative to the second position.

13. The apparatus of claim 7 wherein the hay bale receiving space is sized to hold a plurality of round hay bales in an end-to-end relationship.

* * * * *